(12) United States Patent
Crona (10) Patent No.: US 11,443,620 B2
(45) Date of Patent: Sep. 13, 2022

(54) METHOD AND APPARATUS FOR MEASURING A HEIGHT OF A VEHICLE

(71) Applicant: Kapsch TrafficCom AG, Vienna (AT)

(72) Inventor: Björn Crona, Jönköping (SE)

(73) Assignee: Kapsch TrafficCom AG, Vienna (AT)

( * ) Notice: Subject to any disclaimer, the term of this patent is extended or adjusted under 35 U.S.C. 154(b) by 505 days.

(21) Appl. No.: 16/681,978

(22) Filed: Nov. 13, 2019

(65) Prior Publication Data

US 2020/0160698 A1    May 21, 2020

(30) Foreign Application Priority Data

Nov. 19, 2018 (EP) ..................................... 18206996
Aug. 20, 2019 (EP) ..................................... 19192569

(51) Int. Cl.
  *G08G 1/017*    (2006.01)
  *G01S 7/497*    (2006.01)

(52) U.S. Cl.
  CPC .......... *G08G 1/0175* (2013.01); *G01S 7/4972* (2013.01)

(58) Field of Classification Search
  None
  See application file for complete search history.

(56) References Cited

U.S. PATENT DOCUMENTS

| | | | |
|---|---|---|---|
| 8,340,356 B2 | 12/2012 | Lehning | |
| 9,207,324 B2 * | 12/2015 | Loschmidt | ............. G08G 1/017 |
| 2010/0202662 A1 | 8/2010 | Chung | |
| 2012/0314030 A1 * | 12/2012 | Datta | ..................... G06V 10/44 |
| | | | 348/44 |
| 2014/0204205 A1 * | 7/2014 | Kotz | ....................... H04N 7/18 |
| | | | 348/142 |

OTHER PUBLICATIONS

Extended European Search Report received for European Patent Application No. 18206996.3, dated May 10, 2019, 8 pages.

* cited by examiner

*Primary Examiner* — James M Anderson, II
(74) *Attorney, Agent, or Firm* — Fiala & Weaver P.L.L.C.

(57) ABSTRACT

A method of measuring a height of a vehicle on a road comprises recording with a vehicle classification sensor a 3D representation of the vehicle passing the section and recording with a camera a 2D image of at least an upper portion of the vehicle and a background; determining an edge profile between the upper portion and the background establishing a fan of rays each extending from the elevated point and through a different one of multiple points along the edge profile; shifting the 3D representation in the coordinate system in height until it is tangent to said fan; and determining said height of the vehicle from the shifted 3D representation in the coordinate system. The disclosed subject matter further relates to an apparatus for performing this method.

10 Claims, 6 Drawing Sheets

METHOD AND APPARATUS FOR MEASURING A HEIGHT OF A VEHICLE

CROSS-REFERENCE TO RELATED APPLICATION(S)

This application claims priority to European Patent Application No. 18 206 996.3, filed on Nov. 19, 2018, and to European Patent Application No. 19 192 569.2, filed on Aug. 20, 2019, both of which are incorporated by reference herein in their entireties.

BACKGROUND

Technical Field

The present disclosed subject matter relates to a method and an apparatus for measuring a height of a vehicle on a road.

Background Art

Measuring the height of vehicles is an important task in ITS (Intelligent Transportation Systems) and vehicle tolling applications when vehicles shall be monitored, directed or tolled depending on their height. For example, different toll rates may apply for vehicles of different heights such as passenger cars on the one hand and tall trucks on the other hand. If, e.g., a certain height limit is used to differentiate lower passenger cars from higher trucks, accurately determining the height of the vehicle is critical to avoid false charges.

Hitherto, vehicle height was either measured with dedicated light barriers or as a by-product of VDC (Vehicle Classification and Detection) sensors mounted overhead the road, such as stereoscopic cameras or laser scanners. Light barriers across the road are costly and prone to reading errors, whereas VDC sensors—while being able to capture a 3D representation from a vehicle of an angle above—have relatively low absolute accuracy in the range of cm of tens of cm, which is too low for cost-critical height readings. Furthermore, stereoscopic cameras use two cameras with mutual spacing, which requires bulky mounting, and the stereoscopic image processing algorithms are sensitive to camera noise. Laser scanners need meticulous calibration, have limitations in terms of scan frequency vs. vehicle velocity, and are "blind" to certain materials.

BRIEF SUMMARY

It is an object of the disclosed subject matter to provide a method and an apparatus for accurately measuring the height of a vehicle on a road with minimal installation costs in existing ITS or tolling scenarios.

To this end, in a first aspect the disclosed subject matter provides for a method of measuring a height of a vehicle on a road, characterised by:

directing a vehicle classification sensor from a point above the road onto a section of the road and recording, in a given coordinate system, with the vehicle classification sensor a 3D representation of the vehicle passing the section;

directing a camera with a known angle of aperture from an elevated point at a side of the road onto the section and recording, with the camera, a 2D image of at least an upper portion of the vehicle and a background above the upper portion;

determining an edge profile between the upper portion and the background in the 2D image;

establishing, in the coordinate system, a fan of rays each extending from the elevated point and through a different one of multiple points along the edge profile;

shifting the 3D representation in the coordinate system in height until it is tangent to said fan; and determining said height of the vehicle from the shifted 3D representation in the coordinate system.

The disclosed subject matter combines the absolute mounting and imaging accuracy of the 2D side view camera with the relative modelling accuracy of the 3D classification sensor to re-reference the 3D representation in space by the 2D image as absolute height reference. As a result any required height of a vehicle can be determined from the calibrated 3D representation with the accuracy of the 2D image at best. 2D cameras with high resolution are commercially available at low cost. Implementing the present method in an existing ITS or tolling environment needs very few additional installations such as mounting a low-cost 2D camera at the side of the road in the vicinity of an existing 3D vehicle classification sensor. For example, current high-definition (HD) or 4K cameras with a vertical resolution of 1080 or 2160 pixel lines can yield, over an aperture angle of 30° at a viewing distance of 3 m, a height resolution of approximately 1.4 or 0.7 mm, which vertical resolution can be imposed on the z-height of the 3D representation.

The vehicle height that can be measured according to the disclosed subject matter can be any height of the vehicle, e.g., the maximum height of the vehicle, the height of the vehicle above the first axle of the vehicle, the height of the driver's cabin of a truck, the height of a trailer, etc. According to an optional embodiment of the disclosed subject matter, the height to be measured is the maximum height of the vehicle. To this end, determining the height from the shifted 3D representation comprises finding a topmost portion of the vehicle in the shifted 3D representation and measuring the height of the topmost portion in the coordinate system. This embodiment takes into account that the 2D side view camera might not have captured an image wherein the topmost portion appears in the edge profile of the vehicle before the background, e.g., when the 2D image was taken obliquely from above and the topmost portion was in the middle of the vehicle. According to the disclosed subject matter, in the 3D representation calibrated by the 2D image any height can be located, including the height of the topmost portion of the vehicle.

The recording of the 3D representation on the one hand and the 2D image on the other hand of the passing vehicle can be coordinated in any possible way. For example, an external detector can detect the passing vehicle and trigger the camera and the classification sensor. Or, the camera can detect the passing vehicle and trigger the vertical classification sensor to record the 3D representation. Alternatively, the vehicle classification sensor triggers the camera when it detects the vehicle to be in front of the camera. In particular, an existing VDC (Vehicle Classification and Detection) sensor installed at the road can be used to trigger the additionally installed 2D camera.

Generally, as vehicle classification sensor any sensor which is capable of recording a 3D representation of a passing vehicle can be used, e.g., a radar sensor or, alternatively, a stereoscopic camera or a laser scanner.

The 2D camera can be mounted short before or after the mounting site of the classification sensor, e.g., on a separate post at the side of the road. Optionally, the vehicle classification sensor is installed on a gantry spanning the road and the camera is installed on a side pillar of the gantry, so that one and the same gantry can be used for both the 3D sensor and the 2D camera.

In a second aspect the disclosed subject matter provides for an apparatus for measuring a height of a vehicle on a road, characterized by:

a vehicle classification sensor directed from a point above the road onto a section of the road and configured to record, in a given coordinate system, a 3D representation of the vehicle passing the section;

a camera with a known angle of aperture directed from an elevated point at a side of the road onto the section and configured to record a 2D image of at least an upper portion of the vehicle and a background above the upper portion; and a processor connected to the vehicle classification sensor and the camera and configured to determine an edge profile between the upper portion and the background in the 2D image, establish, in the coordinate system, a fan of rays each extending from the elevated point and through a different one of multiple points along the edge profile, shift the 3D representation in the coordinate system in height until it is tangent to said fan, and determine said height of the vehicle from the shifted 3D representation in the coordinate system.

As to the present apparatus, the same benefits, advantages and optional features apply as were discussed for the method of the disclosed subject matter.

BRIEF DESCRIPTION OF THE DRAWINGS/FIGURES

The disclosed subject matter will now be described by means of exemplary embodiments thereof with reference to the enclosed drawings, in which show.

DETAILED DESCRIPTION

Figure 1:
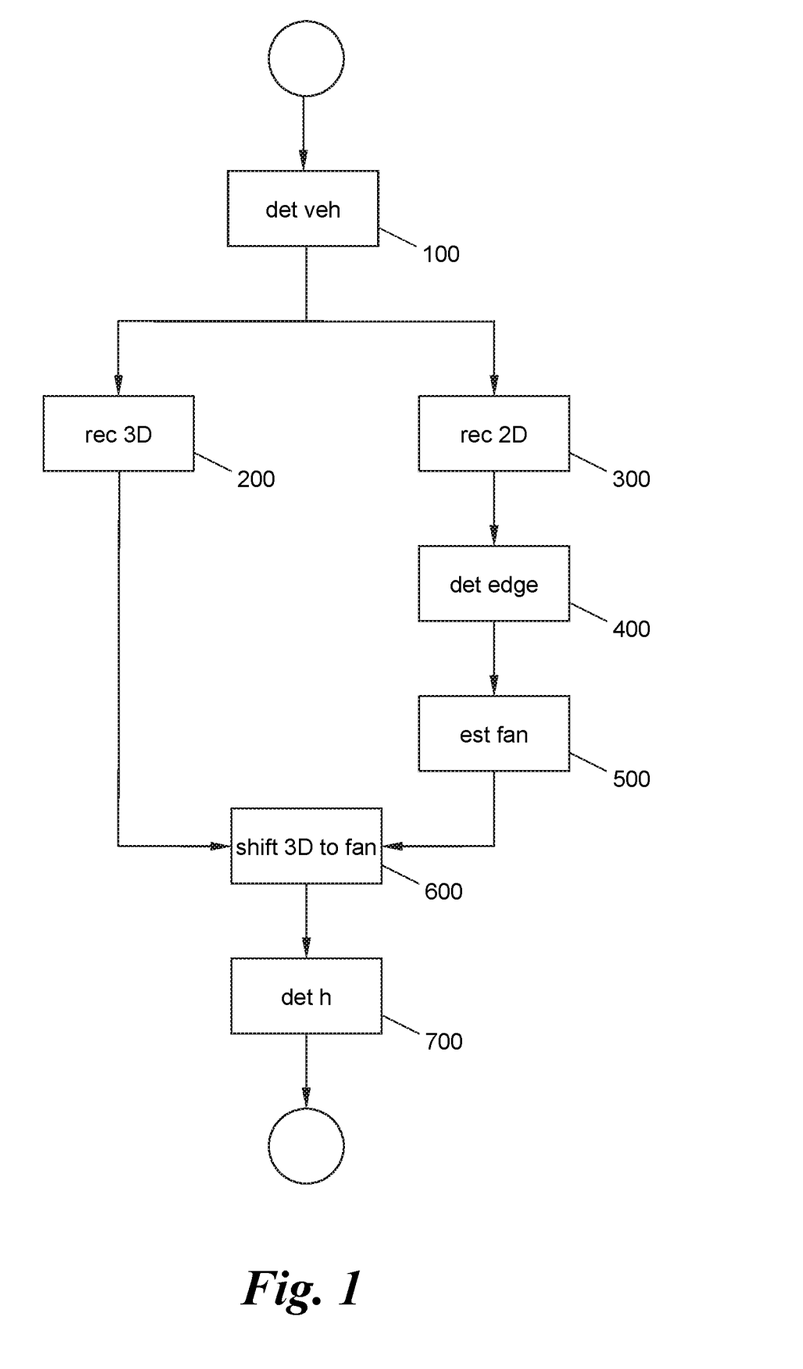
FIG. 1 a flowchart of the method of the disclosed subject matter.
Figure 2:
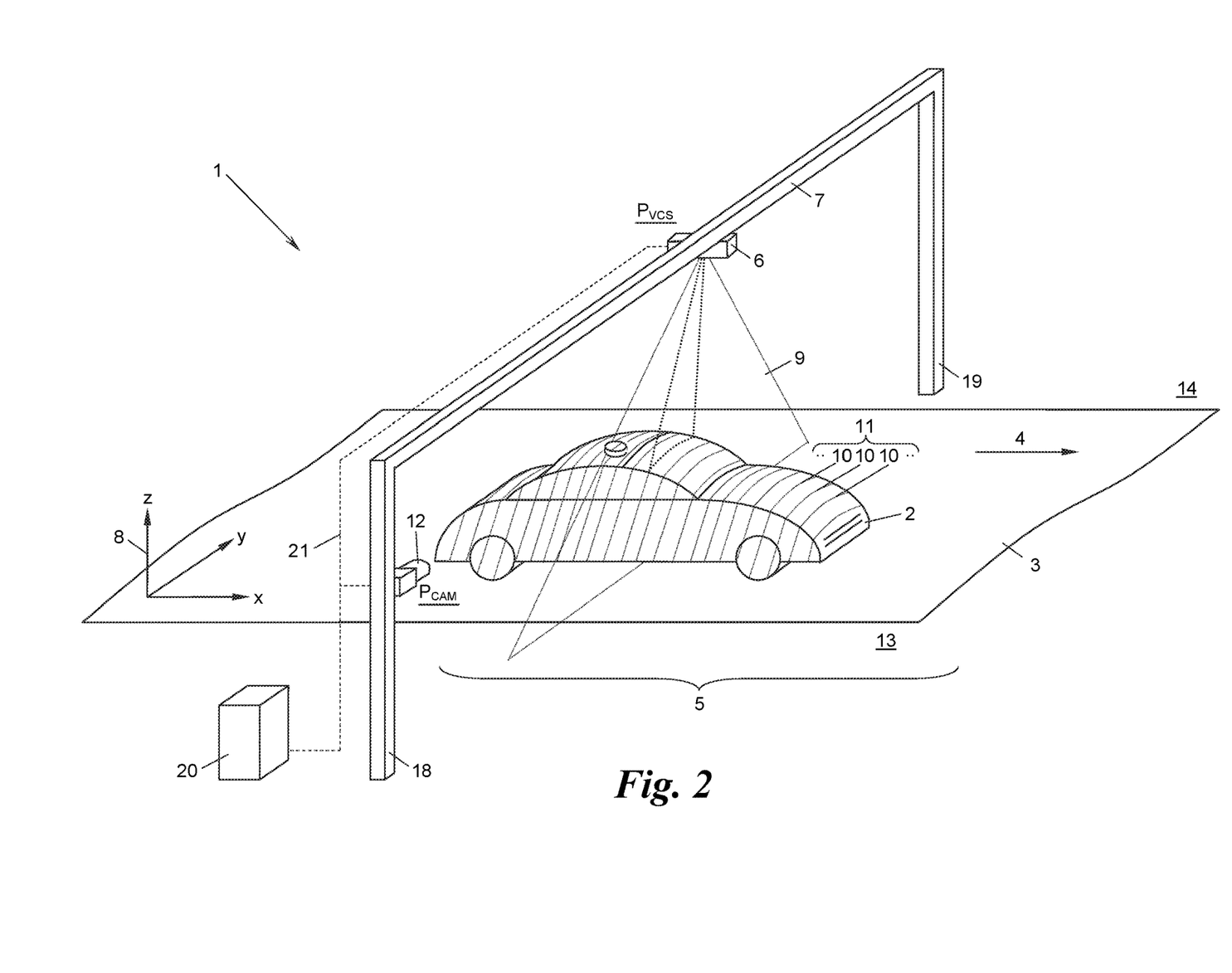
FIG. 2 an apparatus according to the disclosed subject matter, performing a first step of the method, in a perspective view.

FIG. 1 shows a method and FIG. 2 an apparatus 1 for measuring a height h (FIG. 7) of a vehicle 2 on a road 3. The road 3 has a direction of travel 4. The vehicle 2 is usually passing a section 5 of the road 3 in the direction 4, but the vehicle 2 could also be at rest within the section 5.

The apparatus 1 comprises a vehicle classification sensor 6 mounted above the road 3, e.g., on a gantry 7 spanning the road 3. The position (incl. attitude) of the road 3 and the position (incl. attitude) $P_{VCS}$ of the vehicle classification sensor 6 within a given coordinate system 8 are known.

The vehicle classification sensor 6 can be a stereoscopic camera, a radar scanner, a laser scanner or generally any sensor which is capable of recording a 3D representation of the vehicle 2 in the section 5 from its mounting and viewing point $P_{VCS}$. If the classification sensor 6 is, a e.g., laser scanner, it projects a fan of light rays 9 onto the road 3. From reflections of the light rays of the fan 9 the shape of the vehicle 2 can be recorded in the sensor 6, e.g., by time-of-flight or interference measurements on the projected and reflected light rays. When only moving vehicles 2 shall be scanned, the light ray fan 9 can be kept stationary, and the pass of the vehicle 2 yields a sequence of scan lines 10 the entirety of which form a 3D representation 11 of the shape of the vehicle 2 in the coordinate system 8. When also stationary vehicles shall be scanned, the light ray fan 9 can be swept, e.g., in the direction of travel 4, to scan a vehicle 2 at rest in the section 5.

Figure 3A:
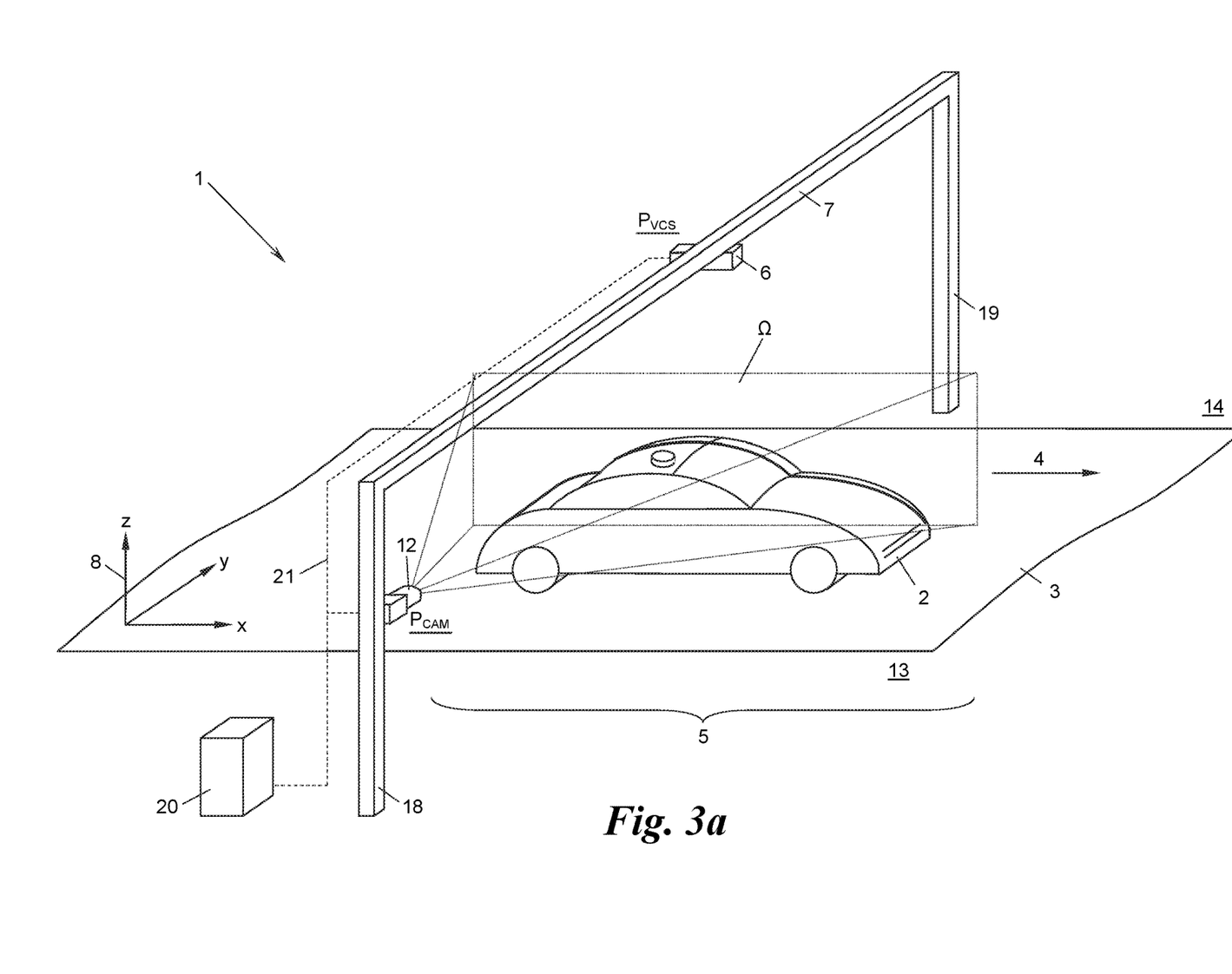
FIGS. 3a and 3b the apparatus of FIG. 2, performing a second step of the method, in a perspective view (FIG. 3a) and in a fragmentary front view (FIG. 3b), respectively.
Figure 3B:
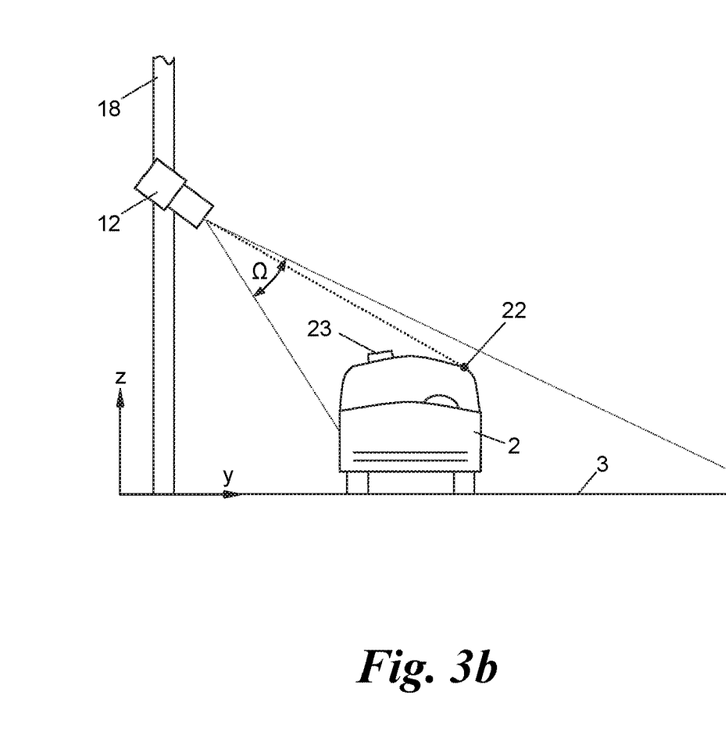

The apparatus further comprises a camera 12 directed from an elevated point $P_{CAM}$ at one of the sides 13, 14 of the road 3 onto the section 5. The camera 12 has an angle of aperture Ω (FIGS. 3a and 3b) and records a 2D image 15 (FIG. 4) of the scene appearing within its angle of aperture Ω in front of it. The mounting position (incl. attitude) $P_{CAM}$ and the angle of aperture Ω of the camera 12 are chosen such that the 2D image 15 comprises—when a vehicle 2 is in front of the aperture Ω—at least an upper portion 16 of the vehicle 2 and a background 17 appearing above the upper portion 16, see FIG. 4.

The camera 12 can be of any type which is capable of recording a 2D image of a scene, e.g., a still or video camera with a CCD or CMOS chip. The resolution of the camera 12, can, e.g., be HD (high definition) with 1920 pixels×1080 pixels, or 4K with 3840 pixels×2160 pixels. In particular, its vertical resolution in the z-axis of the coordinate system 8 can be 480, 768, 1024, 1080, 2048, 2160 pixels etc.

The camera 12 can be mounted on the same gantry 7 on which the vehicle classification sensor 6 is mounted, e.g., on one of the side pillars 18, 19 of the gantry 7, or on a separate pillar or post (not shown). The camera 12 need not be directed perpendicularly to the direction of travel 4 but could be directed obliquely thereto, as long as its concrete mounting point (incl. attitude) $P_{CAM}$ in the coordinate system 8 is known; then any perspective distortion of the 2D image 15 can be geometrically taken into account in the steps of the method explained further below.

The same applies to the vehicle classification sensor 6, which can be directed obliquely onto the road section 5. Any perspective distortion of the 3D representation 11 caused by such an oblique mounting of the sensor 6 can be geometrically taken into account in the steps of the method explained in the following.

The apparatus 1 also comprises a processor 20 connected to the vehicle classification sensor 6 and the camera 12. The processor 20 receives, over data connections 21, the 3D representation 11 from the vehicle classification sensor 6 and the 2D image 15 from the camera 12 and processes those according to the method shown in FIG. 1 and explained in detail later on. It goes without saying that the processor 20 or a part thereof can be integrated into the vehicle classification sensor 6 and/or the camera 12, and other parts of the processor 20 or the entire processor 20 could even be installed at a remote location.

Under reference to the flowchart of FIG. 1 on the one hand and FIGS. 2-7 on the other hand the method performed with the apparatus 1 is now described in detail.

In a first step 100 the presence or passing of a vehicle 2 in or along the section 5 of the road 3 is detected. Detecting the vehicle 2 triggers the recording of the 3D representation 11 of the vehicle 2 by means of the vehicle classification sensor 6 (step 200) as well as the recording of the 2D image 15 by means of the camera 12 (step 300). Detecting the vehicle 2 in step 100 can be made, e.g., with a dedicated vehicle detector such as a pressure switch in the road 3, a light barrier across the road 3 etc. Alternatively the camera 12 itself can be used as vehicle detector in step 100, e.g., when an image processing of the 2D image 15 indicates the presence of a top portion 16 of the vehicle 2 in the image 15. Furthermore, also the vehicle classification sensor 6 itself can be used as a vehicle detector in step 100, e.g., when the reflected light ray fan 9 indicates the presence of a vehicle 2 in the section 5. It is not necessary that the 3D representation recording step 200 and the 2D image recording step 300 are done simultaneously, i.e., step 200 can be performed before or after step 300.

Figure 4:
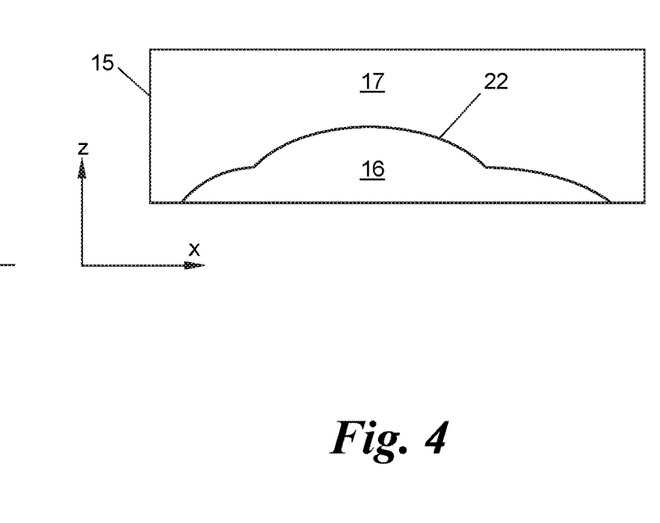
FIG. 4 the step of determining an edge profile in the 2D image recorded in FIGS. 3a and 3b.

In step 400, an edge profile 22 is determined between the upper portion 16 of the vehicle 2 and the background 17 in the 2D image 15, see FIG. 4. The determining step 400 can, e.g., be performed by image processing of the 2D image 15. As can be seen from FIG. 3b, the edge profile 22 does not necessarily contain a profile of a topmost portion 23 of the vehicle 2 due to the mounting position and attitude $P_{CAM}$ and angle of aperture $\Omega$ of the camera 12. The edge profile 22 is a spline (curve in space) in the coordinate system 8.

Figure 5:
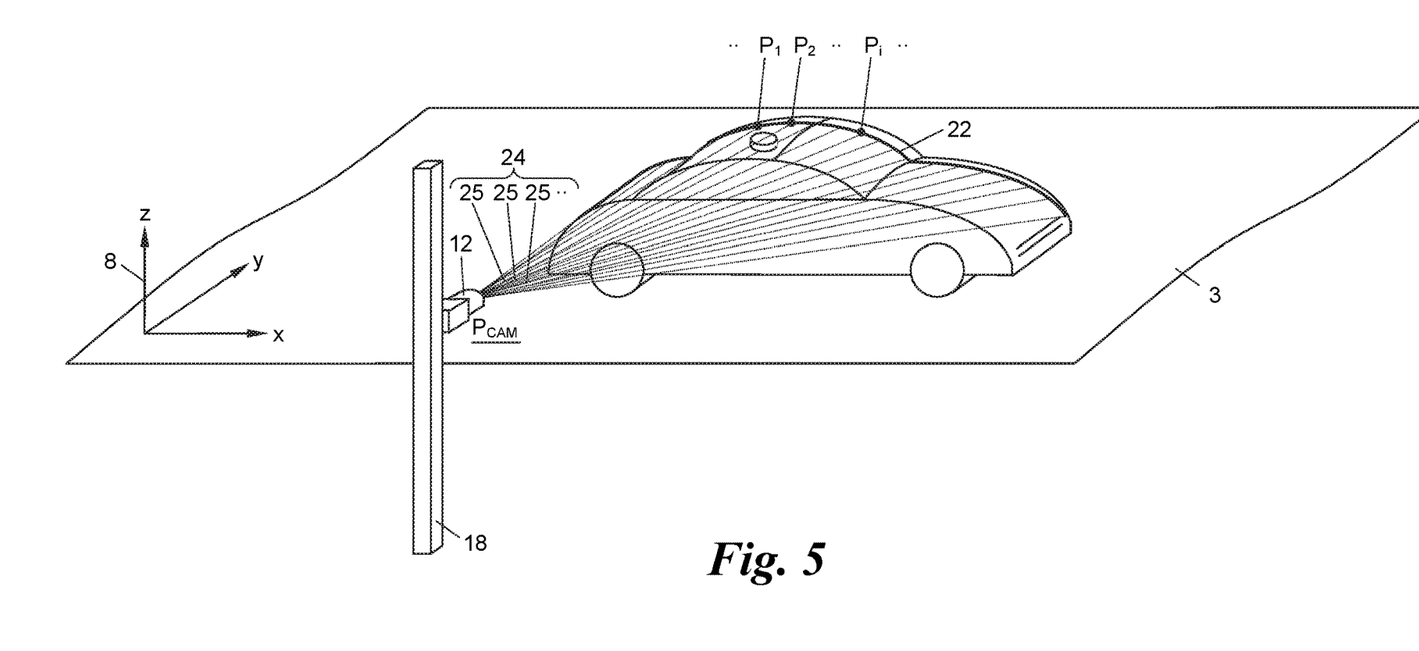
FIG. 5 the step of establishing a fan of rays through the edge profile determined in FIG. 4.

Next, in a step 500 also depicted in FIG. 5, in the coordinate system 8 a fan 24 of rays 25, each of which extends from the elevated mounting point $P_{CAM}$ of the camera 12 and goes through a different one of multiple points $P_1, P_2, \ldots$, generally $P_i$, along the edge profile 22 is established. The fan 24 is actually a sector of a cone mantle, the base of which is outlined by the edge profile 22 and the apex of which is the mounting point $P_{CAM}$.

Figure 6A:
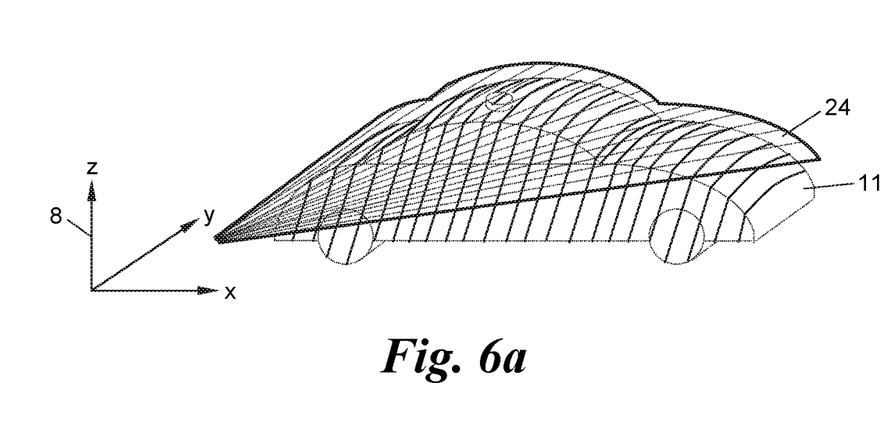
FIGS. 6a and 6b the step of shifting the 3D representation of FIG. 2 to match the fan of FIG. 5.
Figure 6B:
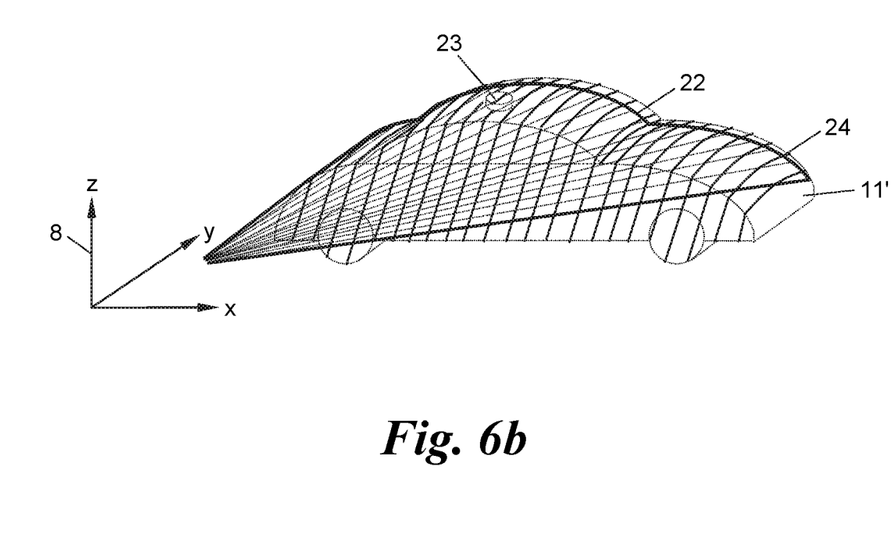

In a subsequent step 600 the 3D representation 11 from step 200, shown in FIG. 6a in the coordinate system 8 together with the fan 24, is shifted in height (z-axis) until it is tangent to the fan 24, see FIG. 6b. The height-shifted 3D representation is designated with the reference numeral 11'. In the tangent position shown in FIG. 6b, the edge profile 22 is both part of the fan 24 as well as part of the shifted 3D representation 11'. The z-position of the shifted 3D representation 11' is thus calibrated to the z-position of the edge profile 22 recorded with the camera 12 in the 2D image 15.

Figure 7:
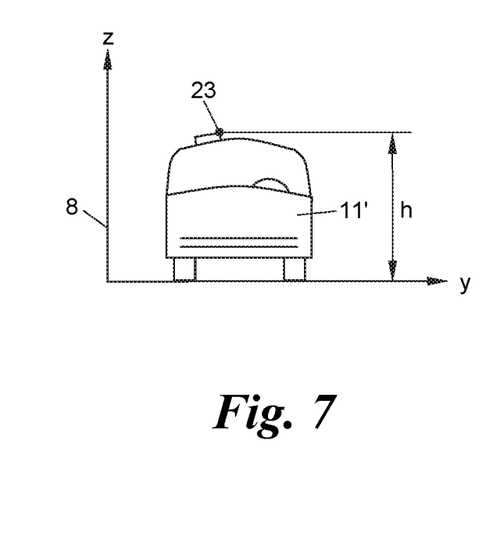
FIG. 7 the step of determining the height from the shifted 3D representation of FIG. 6b.

In step 700, shown in FIG. 7, any required height can now be determined from the shifted 3D representation 11' in the coordinate system 8. For example, by finding the topmost portion 23 in the shifted 3D representation 11' the maximum height h of the vehicle 2 on the road 3 can be determined as the height of the topmost portion 23, i.e. its z-axis value when the road 3 is at z=0, in the coordinate system 8 with, in the best case, the accuracy of the vertical resolution of the 2D image 15, although the 2D image 15 never even showed this topmost portion 23.

Instead of determining the maximum height of the vehicle 2, any other height h of the vehicle 2 can also be determined from the shifted 3D representation 11', e.g., the height of the vehicle 2 above the first axle of the vehicle, the height of the driver's cabin of a truck, the height of a trailer, etc.

CONCLUSION

The disclosed subject matter is not restricted to the specific embodiments described above but encompasses all variants, modifications and combinations thereof that fall within the scope of the appended claims.

What is claimed is:

1. A method of measuring a height of a vehicle on a road, comprising:
    directing a vehicle classification sensor from a point above the road onto a section of the road and recording, in a given coordinate system, with the vehicle classification sensor a 3D representation of the vehicle passing the section;
    directing a camera with a known angle of aperture from an elevated point at a side of the road onto the section and recording, with the camera, a 2D image of at least an upper portion of the vehicle and a background above the upper portion of the vehicle;
    determining an edge profile between the upper portion of the vehicle and the background in the 2D image;
    establishing, in the coordinate system, a fan of rays each extending from the elevated point and through a different one of multiple points along the edge profile;
    shifting the 3D representation in the coordinate system in height until it is tangent to said fan; and
    determining said height of the vehicle from the shifted 3D representation in the coordinate system.

2. The method of claim 1, wherein said determining the height from the shifted 3D representation in the coordinate system comprises:
    finding a topmost portion of the vehicle in the shifted 3D representation; and
    measuring the height of the topmost portion of the vehicle in the coordinate system.

3. The method of claim 1, wherein the vehicle classification sensor triggers the camera when it detects the vehicle to be in front of the camera.

4. The method of claim 1, wherein the vehicle classification sensor is a stereoscopic camera or a laser scanner.

5. The method of claim 1, wherein the vehicle classification sensor is installed on a gantry spanning the road and the camera is installed on a side pillar of the gantry.

6. An apparatus for measuring a height of a vehicle on a road, comprising:
    a vehicle classification sensor directed from a point above the road onto a section of the road and configured to record, in a given coordinate system, a 3D representation of the vehicle passing the section;
    a camera with a known angle of aperture directed from an elevated point at a side of the road onto the section and configured to record a 2D image of at least an upper portion of the vehicle and a background above the upper portion of the vehicle; and
    a processor connected to the vehicle classification sensor and the camera and configured to
        determine an edge profile between the upper portion of the vehicle and the background in the 2D image,
        establish, in the coordinate system, a fan of rays each extending from the elevated point and through a different one of multiple points along the edge profile,
        shift the 3D representation in the coordinate system in height until it is tangent to said fan, and
        determine said height of the vehicle from the shifted 3D representation in the coordinate system.

7. The apparatus of claim 6, wherein the processor is configured to, when determining the height from the shifted 3D representation, find a topmost portion of the vehicle in the shifted 3D representation and measure the height of the topmost portion of the vehicle in the coordinate system.

8. The apparatus of claim 6, wherein the vehicle classification sensor or the processor is configured to trigger the camera upon detecting the vehicle to be in front of the camera.

9. The apparatus of claim 6, wherein the vehicle classification sensor is a stereoscopic camera or a laser scanner.

10. The apparatus of claim 6, wherein the vehicle classification sensor is installed on a gantry spanning the road and the camera is installed on a side pillar of the gantry.

* * * * *